(12) United States Patent
Lysaght et al.

(10) Patent No.: US 8,271,557 B1
(45) Date of Patent: Sep. 18, 2012

(54) CONFIGURATION OF A LARGE-SCALE RECONFIGURABLE COMPUTING ARRANGEMENT USING A VIRTUAL FILE SYSTEM INTERFACE

(75) Inventors: Patrick Lysaght, Los Gatos, CA (US); Brandon J. Blodget, Santa Clara, CA (US); Adam P. Donlin, Los Gatos, CA (US); Paul M. Hartke, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 535 days.

(21) Appl. No.: 12/426,943

(22) Filed: Apr. 20, 2009

(51) Int. Cl.
G06F 12/00 (2006.01)
G06F 15/173 (2006.01)
(52) U.S. Cl. .................................. 707/822; 709/225
(58) Field of Classification Search ............ 707/822
See application file for complete search history.

(56) References Cited

U.S. PATENT DOCUMENTS

| | | | |
|---|---|---|---|
| 5,963,726 A * | 10/1999 | Rust et al. | 703/13 |
| 6,704,889 B2 | 3/2004 | Veenstra et al. | |
| 7,024,427 B2 | 4/2006 | Bobbitt et al. | |
| 7,127,678 B2 | 10/2006 | Bhesania et al. | |
| 7,207,041 B2 | 4/2007 | Elson et al. | |
| 7,269,696 B2 | 9/2007 | Muhlestein et al. | |
| 7,337,407 B1 | 2/2008 | Ogami et al. | |
| 7,480,789 B1 * | 1/2009 | Donlin et al. | 713/1 |
| 2003/0191810 A1 | 10/2003 | Muhlestein et al. | |
| 2007/0174366 A1* | 7/2007 | Palapudi et al. | 707/205 |
| 2009/0119257 A1* | 5/2009 | Waters | 707/3 |

OTHER PUBLICATIONS

Title "EDK Concepts, Tools, and Techniques", dated Sep. 18, 2008.*
U.S. Appl. No. 11/901,100, filed Sep. 13, 2007, Donlin, Adam P., Xilinx, Inc., 2100 Logic Drive, San Jose, CA 95124.
U.S. Appl. No. 12/055,163, filed Mar. 25, 2006, Donlin, Adam P. et al., Xilinx, Inc., 2100 Logic Drive, San Jose, CA 95124.
Donlin, Adam, et al., A Virtual File System for Dynamically Reconfiguration FPGAs, FPL 2004, LNCS 3203, pp. 1127-1129, Springer-Verlag Berlin Heidelberg , Aug. 2004.
Troger, Gerd, TPC Electronics, FPGAs & Dynamic (Re) Configuration—ongoing work, troeger@kip.uni-heidelberg.de Apr. 7, 2005, pp. 1-27.
Kwok-Hay So, Hayden, et al., Improving Usability of FPGA-based Reconfigurable Computers Through Operating System Support, IEEE , Aug. 28-30, 2006, pp. 1-6.

* cited by examiner

*Primary Examiner* — Tarek Chbouki
(74) *Attorney, Agent, or Firm* — LeRoy D. Maunu; Thomas George

(57) ABSTRACT

A top-level directory of a virtual file system is created. A hierarchy of directories is created under the top-level directory including creating a first file that contains an architecture description of the multi-device circuit arrangement. The directories have names indicative of the plurality of devices and configurable resources of the plurality of devices of the architecture description specified in the first file. A first set of one or more files is created that contain state data or configuration data for configuring resources of the plurality of devices to perform functions specified by the configuration data. A mapping of the configuration data to the resources of the plurality of devices is determined, and configuration data is stored in the configurable resources according to the mapping.

17 Claims, 13 Drawing Sheets

CONFIGURATION OF A LARGE-SCALE RECONFIGURABLE COMPUTING ARRANGEMENT USING A VIRTUAL FILE SYSTEM INTERFACE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to managing the configuration of a large-scale reconfigurable computing arrangement for one or more applications.

BACKGROUND

The technology of programmable logic devices (PLDs) has progressed to a level such that it is possible to implement a microprocessor on a PLD and host an operating system such as Linux®. Not only may this support various system on a chip (SOC) applications, but with the capabilities of a PLD such as a Virtex® field programmable gate array (FPGA) from Xilinx®, Inc., of San Jose, Calif., the SOC is reconfigurable to suit changing requirements or adjust to changing environmental conditions.

The configuration of a PLD such as an FPGA, generally refers to the state of the configurable logic resources of the device as programmed to accomplish a set of required functions. Data that is loaded into the device to achieve a desired configuration may be referred to as a configuration bitstream or configuration data. The state of the device generally refers to the contents of registers and memories in the device at a chosen time while the device is performing the desired functions.

In developing and maintaining a design it is often necessary to access the configuration and state of the PLD. Devices such as the Virtex® FPGA have various modes available for accessing the configuration data and state. For example, for general needs the SelectMap interface of the Virtex® FPGA may be used to load a configuration bitstream into the device or read back configuration data from the device. For testing and diagnostic activities, a boundary scan interface may be used to establish or read back state data. The internal configuration access port (ICAP) may be implemented on a Virtex® FPGA to manipulate configurable resources after the device has already been configured.

Even though these interfaces for accessing configuration data or device state are suitable for most purposes, the interfaces are low-level (less abstract) and may be unnecessarily complex for some applications. For example, the low-level interface may not be familiar to the developer of a system having a number of PLDs. The developer's lack of familiarity may present scheduling, reliability, and cost issues.

Further complicating the tasks of managing configuration data and configuring a device is the range of applications in which PLDs may be used. For example, PLDs such as FPGAs have been used in constructing supercomputers. A typical FPGA supercomputer is an assembly of one or more printed circuit boards (PCBs) in which each PCB contains multiple FPGAs, memories, other compute nodes and interconnect devices. The PCBs may be stacked into a cabinet with a high bandwidth backplane to allow data to be exchanged between FPGAs. With the large number of devices and communication channels in such systems, managing the software and hardware configurations of multi-device systems such as supercomputers is very complex.

The present invention may address one or more of the above issues.

SUMMARY OF THE INVENTION

One or more embodiments of the invention provide various approaches for controlling configuration of a plurality of devices of a multi-device circuit arrangement. In one embodiment, a method creates a top-level directory of a virtual file system. The virtual file system is registered with an operating system. A hierarchy of directories is created under the top-level directory including creating under the top-level directory a first file that contains an architecture description of the multi-device circuit arrangement. The directories have names indicative of the plurality of devices and configurable resources of the plurality of devices of the architecture description specified in the first file. Under the top-level directory is created a first set of one or more files that contain state data or configuration data for configuring resources of the plurality of devices to perform functions specified by the configuration data. The method determines a mapping of the configuration data to the resources of the plurality of devices and stores the configuration data in the configurable resources according to the mapping.

The determining the mapping element includes reading constraint information from the first set of one or more files, determining resources of the plurality of devices that satisfy the constraints, and assigning the configuration data to the resources determined to satisfy the constraints. The method also includes, in response to invocation of an operating system file access command that inputs program code from a program file to a memory device of the plurality of devices, performing the following: creating an interface circuit for the memory device, and reading program code from the program file, inputting the program code to the interface circuit, and writing the program code to the memory device. The operating system file access command that inputs program code from a program file to a memory device is a command that inputs the program file to a named software pipe associated with the interface circuit.

The method further includes reading the state data from a first device in response to invocation of an operating system file access command that references a file under a directory that represents the first device, storing the state data in a second device in response to invocation of an operating system file access command that references a directory that represents the second device, and storing configuration data in the second device in response to invocation of an operating system file access command that references a directory that represents the second device. In addition, the method includes automatically starting a self-test of one of the plurality of devices in response to invocation of an operating system file system command on a directory that represents the one of the plurality of devices. The operating system file system command on the directory is a command that opens the directory.

The creating the hierarchy of directories includes: creating two or more virtual system directories under the top-level directory and a respective hierarchy of directories under each virtual system directory, each virtual system directory represents a respective virtual system, and the directories under each virtual system directory are respectively representative of a subset of the plurality of devices and configurable resources of the subset assigned to the virtual system represented by the virtual system directory; assigning access rights to the virtual system directories for users of the virtual systems; and denying access to one of the two or more virtual system directories and the respective hierarchy of directories under the one of the virtual system directories in response to a user invoking an operating system file system access command that references the one virtual system directory or the respective hierarchy of directories, and the user not having access rights to the one virtual system directory.

Creating a hierarchy of directories under the top-level directory comprises creating the hierarchy of directories under the top-level directory in response to invocation of an operating system file access command.

The steps performed in response to invocation of an operating system file access command that creates the first set of one or more files under the top-level directory further include storing configuration data from the first set of one or more files in a second set of files including a plurality of configuration files under directories of the hierarchy according to the mapping, where each file in the second set represents a respective set of configuration data for configuring a function of a resource of one of the plurality of devices that is represented by the directory containing the file. The operating system file access command that creates under the top-level directory a first set of one or more files is a copy file command.

In another embodiment, a storage device is provided. The storage device comprises a processor readable storage medium configured with instructions for controlling configuration of devices of a multi-device circuit arrangement. The instructions when executed by one or more processors cause the one or more processors to perform the steps including creating a top-level directory of a virtual file system. The virtual file system is registered with an operating system. A hierarchy of directories is created under the top-level directory including creating under the top-level directory a first file that contains an architecture description of the multi-device circuit arrangement. The directories have names indicative of the devices and configurable resources of the devices of the architecture description specified in the first file. Under the top-level directory is created a first set of one or more files that contain state data or configuration data for configuring resources of the devices to perform functions specified by the configuration data. A mapping of the configuration data to the resources of the devices is determined, and the configuration data is stored in the configurable resources according to the mapping.

The element of determining the mapping includes reading constraint information from the first set of one or more files, determining resources of the devices that satisfy the constraints, and assigning the configuration data to the resources determined to satisfy the constraints. The instructions further cause the one or more processors, in response to invocation of an operating system file access command that inputs program code from a program file to a memory device of the devices, to perform the following steps: (1) creating an interface circuit for the memory device; and (2) reading program code from the program file, inputting the program code to the interface circuit, and writing the program code to the memory device.

The instructions further cause the one or more processors to perform the steps including: (1) reading the state data from a first device in response to invocation of an operating system file access command that references a file under a directory that represents the first device; (2) storing the state data in a second device in response to invocation of an operating system file access command that references a directory that represents the second device; and (3) storing configuration data in the second device in response to invocation of an operating system file access command that references a directory that represents the second device.

The instructions further cause the one or more processors to perform the steps including automatically starting a self-test of one of the devices in response to invocation of an operating system file system command on a directory that represents the one of the devices. The operating system file system command on the directory is a command that opens the directory. The instructions further cause the one or more processors to perform the steps including: wherein the creating the hierarchy of directories under the top-level directory includes the creating the hierarchy of directories under the top-level directory in response to invocation of an operating system file access command, and the creating the hierarchy of directories under the top-level directory further includes creating two or more virtual system directories under the top-level directory and a respective hierarchy of directories under each virtual system directory, each virtual system directory represents a respective virtual system, and the directories under each virtual system directory are respectively representative of a subset of the plurality of devices and configurable resources of the subset assigned to the virtual system represented by the virtual system directory. The instructions further cause assigning access rights to the virtual system directories for users of the virtual systems, and denying access to one of the two or more virtual system directories and the respective hierarchy of directories under the one of the virtual system directories in response to a user invoking an operating system file system access command that references the one virtual system directory or the respective hierarchy of directories, and the user not having access rights to the one virtual system directory.

The steps performed in response to invocation of an operating system file access command that creates the first set of one or more files under the top-level directory, further include storing configuration data from the first set of one or more files in a second set of files including a plurality of configuration files under directories of the hierarchy according to the mapping, where each file in the second set represents a respective set of configuration data for configuring a function of a resource of one of the plurality of devices that is represented by the directory containing the file. The operating system file access command that creates under the top-level directory a first set of one or more files is a copy file command.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention support access to PLD configuration data via program calls to file system routines of an operating system kernel. A processor is implemented on a PLD, and an operating system having program callable file system routines executes on the processor. The configuration data is managed in a virtual file system which is registered with the operating system. Access to the PLD configuration data is made through the program invoking standard system calls for file system routines, which in turn invoke the virtual file system. The virtual file system (VFS) reads, writes, or modifies the configuration data according to the file system calls. In one embodiment, the virtual file system interfaces with a configuration controller implemented on the PLD, and the configuration controller manipulates the configuration data on the PLD.

The approaches described herein for providing access to PLD configuration data may be useful for a variety of purposes such as use of the VFS by application level archiving, revision control program suites, and also reliability enhancement techniques such as, e.g., the techniques used in redundant arrays of independent disks (RAID) or mirroring for fault tolerant operation. For example, the VFS approach may be useful for configuration management. By using the file system approach, standard revision control systems may be used to manage the configuration data for a variety of PLD applications. Revision control systems are able to reconcile the version (revision) of a given file to that in a central repository. With past approaches, revision control systems have been generally used to manage the configuration data of a PLD as a monolithic data set, i.e., the configuration bitstream. With the VFS approach, the revision control system may control and track the configuration data to a user-specified level of file abstraction.

The various embodiments of the invention support creation and restoration of archive collections of VFS files using standard file archiving tools. The data within the files represents the configuration (and/or state) of the PLD and may be applied at a remote system by using the same archive tool to re-write the files into the appropriate regions of the VFS hierarchy.

The configuration data is stored in a hierarchical directory structure, which provides device independence/abstraction. The hierarchical directory structure may be used to allow configuration data intended for one device size/architecture/family to be applied to another device with a different size/architecture/family. This may be implemented at the VFS driver level.

Figure 1:
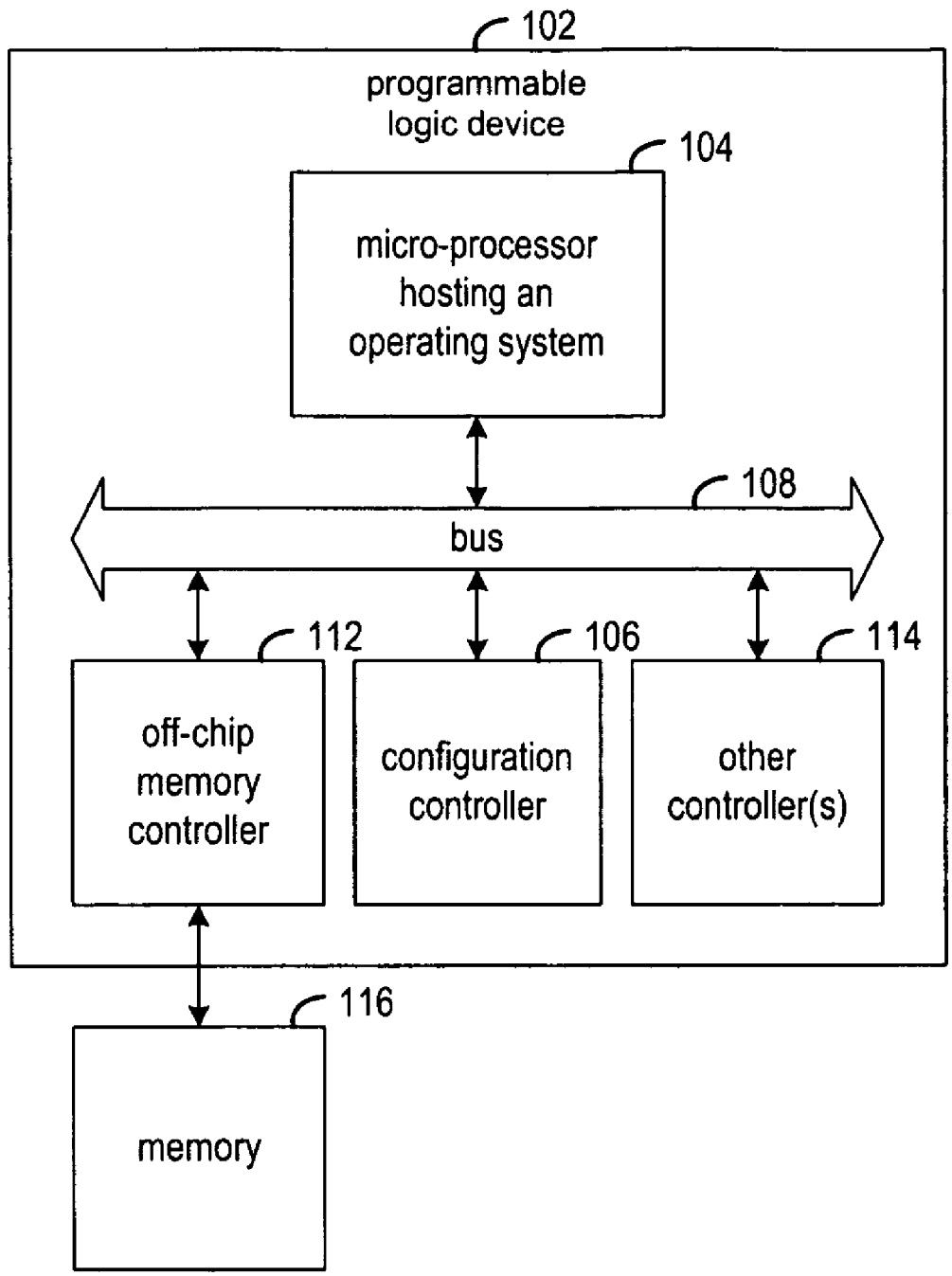
FIG. 1 is a block diagram that illustrates a programmable logic device (PLD) having implemented therein a microprocessor.

FIG. 1 is a block diagram that illustrates a programmable logic device (PLD) 102 having implemented therein a microprocessor 104. The microprocessor 104 may be implemented with the PLD logic and in one embodiment hosts an operating system, such as Linux®, that supports a VFS.

In addition to the microprocessor, the PLD 102 has implemented therein a configuration controller 106 which interfaces with the microprocessor via bus 108. The configuration controller supports access to the configuration state of the PLD over general interconnect circuitry within the device. For example, in one embodiment, the PLD 102 is a field programmable gate array (FPGA) such as a Virtex® FPGA from Xilinx®, Inc., and the configuration controller 106 may be implemented with the internal configuration access port (ICAP).

ICAP allows configuration of the internal logic resources after the device is configured. The ICAP block exists in the lower right corner of the array and emulates the SelectMAP configuration protocol from Xilinx®. ICAP supports reconfiguration of the device and bus interfaces such as the peripheral component interface (PCI).

In other embodiments, the configuration controller 106 may be implemented with a SelectMap or JTAG boundary scan or other physical port having access to a configuration bitstream stored internal to the PLD, external to the PLD or any combination thereof. In addition the microprocessor hosting the operating system supporting the VFS may be internal or external to the PLD. For example, the VFS can be running on a processor external to the PLD and the VFS uses the SelectMap/BoundaryScan/other-physical-port to manipulate the configuration data on the PLD.

Depending on application and implementation requirements, the PLD may be configured with additional controllers, for example, controllers 112 and 114, that provide access to off-chip resources. For example, controller 112 may be a memory controller that provides access to memory 116. It will be appreciated that a variety of commercially available or proprietary memory architectures and interfaces may be used to implement the memory controller and memory. Other types of controllers, illustrated by block 114, may provide network or communications interfaces and access to retentive storage systems such as tape drives and disk drives.

The various embodiments of the invention provide access to configuration data of a PLD via a virtual file system (VFS). An operating system such as Linux® supports virtual file systems (VFSs). For example, the Linux® "/proc" VFS allows user-space applications to access the selected ones of the operating system kernel's data structures via basic file I/O operations or function calls. From the perspective of a user-space application, access is made to the configuration data by calling the same file system routines as are called for accessing a file on a storage media such as a disk. However, the access is actually to a data structure in the kernel's memory. In various embodiments of the present invention, access is to the actual configuration data of configurable logic resources of an FPGA or state data of memory cells in the FPGA. It may in general be desirable to access the FPGA configuration data and state data directly rather than caching the data in kernel memory.

Figure 2:
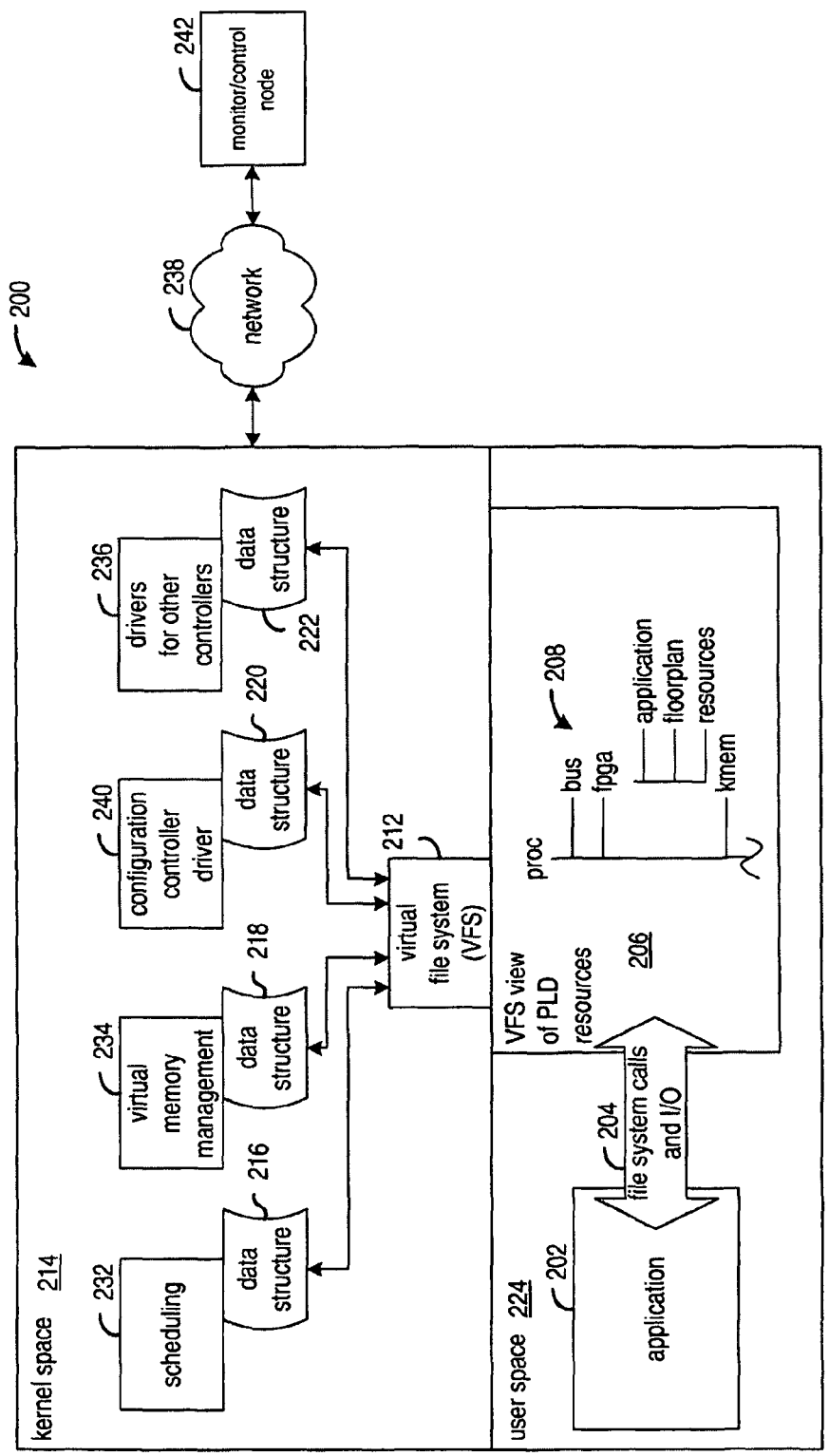
FIG. 2 is a functional block diagram that illustrates a system in which the configuration of a PLD is made accessible via a virtual file system.

FIG. 2 is a functional block diagram that illustrates a system 200 in which the configuration of PLD resources is made accessible via a virtual file system. The application need not directly interface with the configuration controller driver. Instead, the application may make file system calls to the VFS extension, which hides the complexity of the configuration controller from the application.

In an example embodiment, an application program 202 makes file system calls 204 that reference the VFS-implemented view of the PLD resources 206. The PLD resources are represented in the VFS by the LINUX/proc file system in an example embodiment. The application view of the representation is shown as the directory hierarchy 208.

The example directory hierarchy 208 shows an FPGA directory along with example bus and kernel-memory (kmem) directories. The bus and kmem directories illustrate additional kernel-managed resources that may be accessible via a VFS. An FPGA is used as an example of a PLD whose configuration data may be made accessible via the VFS. The configuration data of the FPGA is organized into directories that represent the data by application, by floorplan, and by resources, as shown in more detail in FIGS. 3A-3D. It will be appreciated that the application subdirectory under the FPGA directory relates to the application implemented on the FPGA as compared to the application 202 which may manipulate the FPGA configuration data.

The VFS 212 operates in kernel memory space 214 and provides access to kernel data structures 216, 218, 220, and 222 for application 202, which operates in user memory space 224. The VFS is accessible to the application via file system calls, and the VFS interfaces with the respective kernel components or drivers that manage the referenced data. Example components and drivers in the kernel include a scheduling component 232, a virtual memory management component 234, and other drivers 236 for interfacing with other data structures. The other drivers may include, for example, drivers for interfacing with data communications network 238.

In one embodiment, driver 240 provides VFS access to the configuration controller 106 (FIG. 1). The data accessed by driver 240 is the configuration state of the FPGA as referenced by the parameters in the file system calls made by application 202.

In another embodiment, the driver 240 may be invoked from a network-connected node 242 for controlling or monitoring the FPGA configuration state. This may allow a remote system to maintain a higher-level directory structure that represents the configuration data for all the PLDs that are deployed and managed by the node. Opening a directory/file at node 242 would transparently invoke network file system protocols within node 242 and the file system implemented on the PLD would act as a client. An example use of the network-connected embodiment may involve determining differences between the configuration data of separate PLDs in order to diagnose problems. Standard tools may be used with the embodiments for revision control and archiving of configuration data.

It will be appreciated that in yet another embodiment, the network-connected node 242 could implement the VFS view of directories and files of configuration data instead of the PLD implementing the file system logic.

Figure 3A:
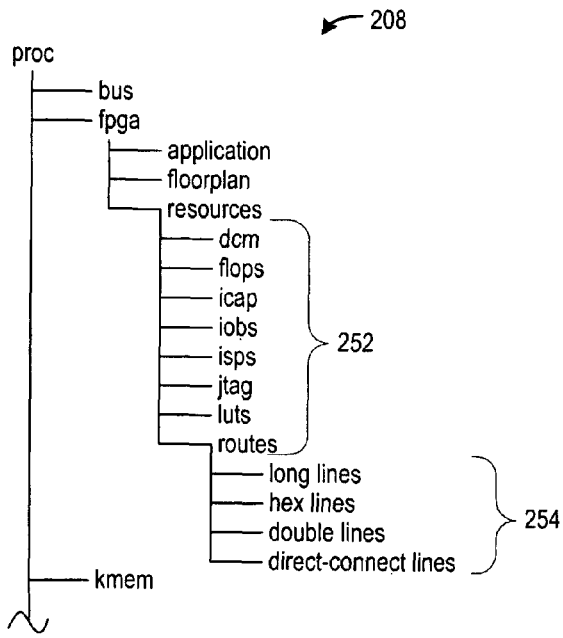
FIGS. 3A, 3B, 3C, and 3D illustrate examples of various alternative hierarchies of directories and files that are associated with configuration data of an FPGA.

FIGS. 3A, 3B, 3C, and 3D illustrate various alternative hierarchies of directories and files that are associated with configuration data of an FPGA. FIG. 3A shows configurable resources of the FPGA for which the configuration data may be modeled as files in a directory hierarchy. The resources directory includes sub-directories for a digital clock manager ("dcm"), FPGA flip flops ("flops"), internal configuration access port ("icap"), input/output blocks ("iobs"), instruction set processors ("isps"), boundary scan architecture ("jtag"), look-up tables ("luts"), and routing resources ("routes"). The class of configuration data is modeled as directories 252.

Within each of directories 252 are further directories or files that represent the configuration data of the FPGA for the resources identified by the directory. For example, the routes directory contains directories 254 for routing resources of the FPGA, including "long lines", "hex lines", "double lines", and "direct-connect lines" directories. Each of directories 254 may contain a directory or file for each instance of the specific routing resource.

Figure 3B:
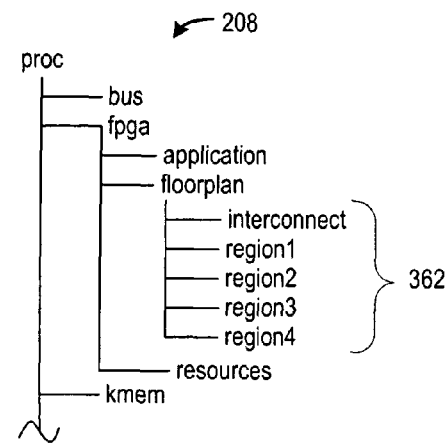

The floorplan view shown in FIG. 3B illustrates modeling of FPGA configuration data by region of the device. The example includes directories for four example regions, region1, region2, region3, and region4. In addition, the floorplan directory includes a directory named, interconnect, for routing resources that connect the regions. Under each of the region directories, region1, region2, region3, and region4, a file represents the configuration data for resources within an area of the FPGA associated with the directory. For example, the device may be viewed as having resources in 4 quadrants, each region directory may be associated with one of the quadrants.

In an example embodiment, the files within each region may also be used to store statistical information pertaining to the region. For example, a file may contain information that indicates the spatial utilization of the region. The total area of the region is communicated to the VFS device driver in a configuration file or by kernel module options. The configuration file may be communicated to the VFS device driver by way of a symbolic ("sym") file handle. A sym file handle is a portal to an interpreter implemented in the VFS driver to which the configuration file may be written. In response, the VFS takes note of the information contained in the configuration file and applies whatever corresponding actions are necessary. Sym files may also be used to communicate which regions exist, the names of the cores, where the registers are placed, and the symbolic names of the registers, for example. This allows the VFS to establish a directory hierarchy for an application with the appropriate directory names and files within those directories.

The spatial utilization of the region may be determined by the VFS module monitoring which parts of the configuration data are affected during configuration. In another embodiment, the configuration data may be accompanied by a configuration mask that could be parsed to reveal the same utilization information. The files could also be used as portals through which new configuration information could be placed into the region. Furthermore, if two regions were compatible at a physical level, the file from one region directory could be copied to the other region directory, resulting in a partial configuration bitstream being loaded into the region of the FPGA associated with the target directory.

Figure 3C:
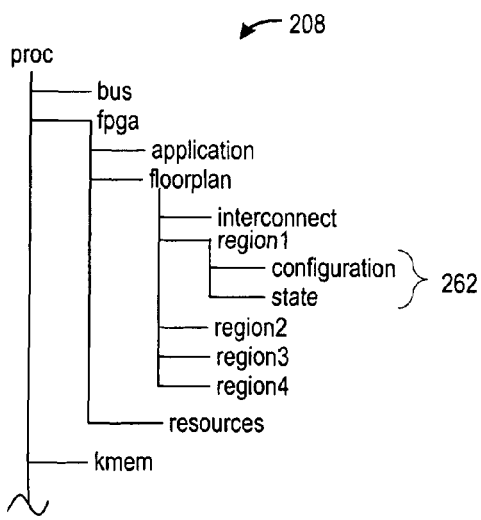

In yet another embodiment, the configuration data associated with a region directory may be further organized by configuration data and state data as shown in FIG. 3C. Configuration data refers to the state of resources of the FPGA that are programmable to implement a desired function, and state data refers to the state of elements of the FPGA that may be subject to change while the FPGA is performing its programmed functions, such as flip flops, registers, memory, and block random access memory (BRAM). Each region directory may have separate directories for each of the configuration and state data, as illustrated by directories 262 under the directory, region1. It will be appreciated that each region directory may have configuration and state files instead of further subdirectories (entries 262 could be files instead of subdirectories).

Figure 3D:
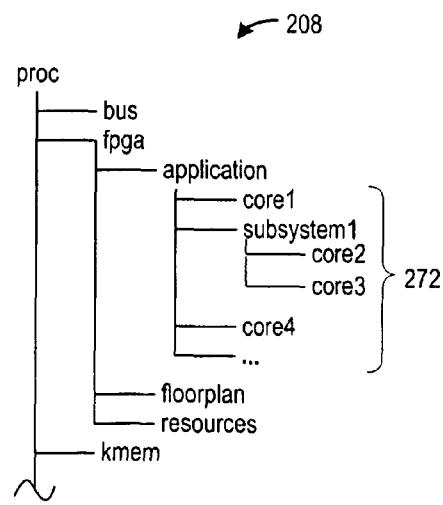

FIG. 3D illustrates example core and subsystem subdirectories 272 under the application directory. Under the application view, there are subdirectories for the constituent cores and subsystems implemented on the FPGA. For example, the application directory in FIG. 3D includes core directories, core1 and core4, along with a subsystem directory, subsystem1, which further includes sub directories, core2 and core3. The files under each core or subsystem directory may represent the registers in the core. Each file representing a register could be interrogated by opening and reading from the file or modified by writing to the file. The behavior of a core may be modified, to the extent allowed by the core, by reprogramming the registers via the file system calls to update the necessary file(s).

In another embodiment, each core directory may further include subdirectories that map to the levels in the application hierarchy (such as that created with a design tool). A file representing the configuration of a part of the core's design hierarchy could be moved or copied to the corresponding level in the core's directory within the VFS directory hierarchy. The file acts as a configuration portal, and overwriting the file substitutes that part of the application design hierarchy with alternative functionality. It will be appreciated that the configuration data that implements the alternative functionality must fit within the same physical region of the FPGA as that region in which the original functionality is implemented.

In support of manipulating configuration data under the application view, symbol data is provided to the driver of the configuration controller. The symbol data enumerates the core's name, type, constituent registers and physical locations, along with design information that describes the logical and physical hierarchy of the design. This information may be provided to the driver via a file in the application directory when the application 202 (FIG. 2) begins executing, and the driver populates its internal data structures with this information.

Figure 4:
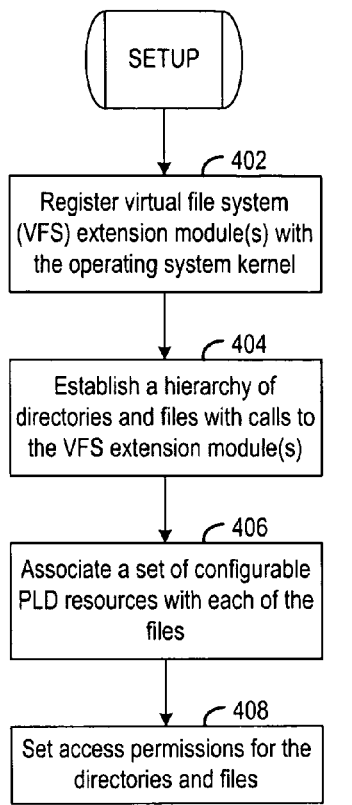
FIG. 4 is a flowchart of an example process for establishing a hierarchical directory and file view of PLD resources in accordance with various embodiments of the invention.

FIG. 4 is a flowchart of an example process for establishing a hierarchical directory and file view of PLD resources in accordance with various embodiments of the invention. The process begins with registration of modules that extend the VFS with the operating system kernel (step 402). Registration informs the kernel that a module exists and may be loaded when the module is to be used and unloaded when use of the module is complete, such as for dynamically linked libraries (DLLs). The particular mechanism by which modules register with an operating system may vary for different types of operating systems. Alternatively, a module may be statically compiled with the kernel.

An application may then make file system calls to establish a hierarchy of directories and files that represent the configuration data of the PLD (step 404). In another embodiment of the VFS, the hierarchy of directories is created by the VFS module when the module is first loaded. As noted below, in the dynamic version of the VFS, the files and directories are created by the VFS in response to the application doing a 'cd'/'ls', etc. in the VFS directory space. The file system routines in turn call the VFS extensions, which create the directories and files. In making the file system calls, configurable resources of the PLD are associated with the directories and files (step 406).

File system access control and file locking may also be implemented for the directories and files that represent the configuration data of the PLD. This functionality is typically provided by the kernel system code rather than the VFS extensions. In one embodiment, the configuration controller driver 240 (FIG. 2) may set owner and access permissions for given files and directories (step 408).

It will be appreciated that the actions of the process of FIG. 4 may be performed somewhat differently when the concepts of the present invention are implemented on different operating systems.

In an alternative embodiment, the directory and files may be created on demand. That is, parts of the directory hierarchy are generated only when needed. For example, in a VFS, directories and files may be generated as a process begins execution and deleted when the process exits. In one embodiment, when an application changes a view to a particular directory (e.g., the "cd" command in LINUX®) the VFS dynamically creates the file system data structures to represent the required resources. In one embodiment, the required resources are hard coded into the implementation of the VFS module. In another embodiment, a configuration mask file may be used to only create the subset of files representing the resources used by the current FPGA configuration. Those skilled in the art will recognize that some of the actual device state may be cached in the software VFS layer executing on the processor(s).

Figure 5:
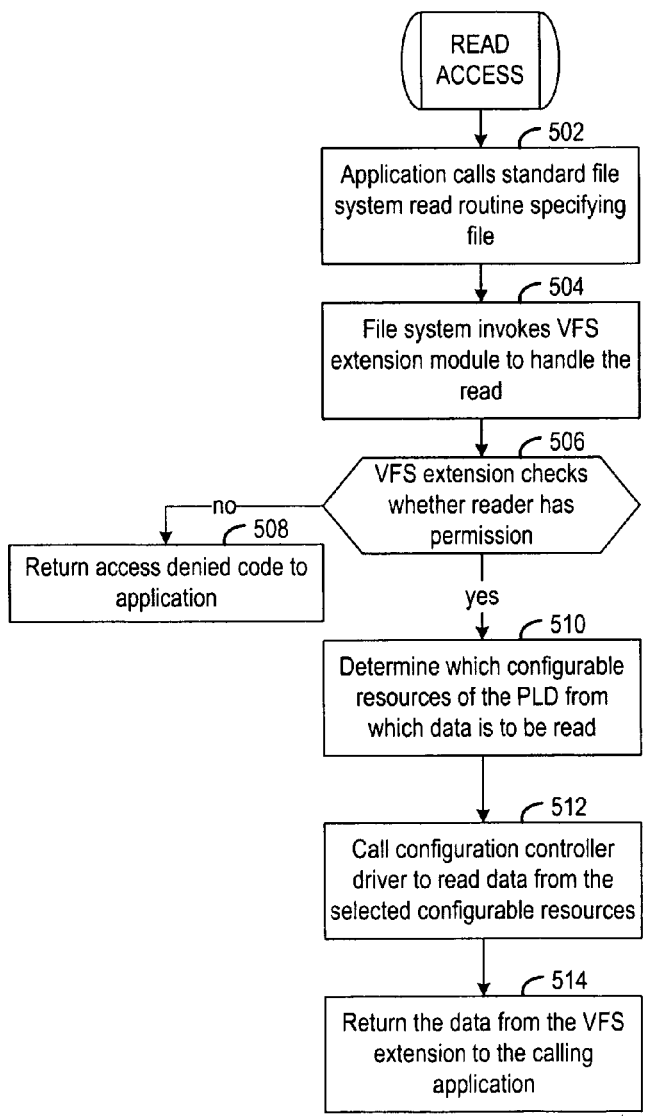
FIG. 5 is a flowchart of an example process for providing read access to data of a PLD via the hierarchical directory and file view of the PLD resources.

FIG. 5 is a flowchart of an example process for providing read access to data of a PLD via the hierarchical directory and file view of the PLD resources. To read configuration data, an application calls a standard file system routine to read a designated file (step 502). The file system in turn calls the VFS extension module for reading configuration data (step 504).

The extension module checks whether the application has permission to read the specified file (or directory) (step 506). If the application lacks permission, control is returned to the calling application with a code that indicates access was denied.

If the application has the requisite permission, the VFS extension modules determines from which configurable resources of the PLD the configuration data is to be read (step 510). This information may be obtained from the configuration controller driver data structures 220 (FIG. 2). The configuration controller driver is then called to read configuration data from the appropriate resources of the PLD (step 512), and the data is returned from the VFS extension to the calling application (step 514).

Figure 6:
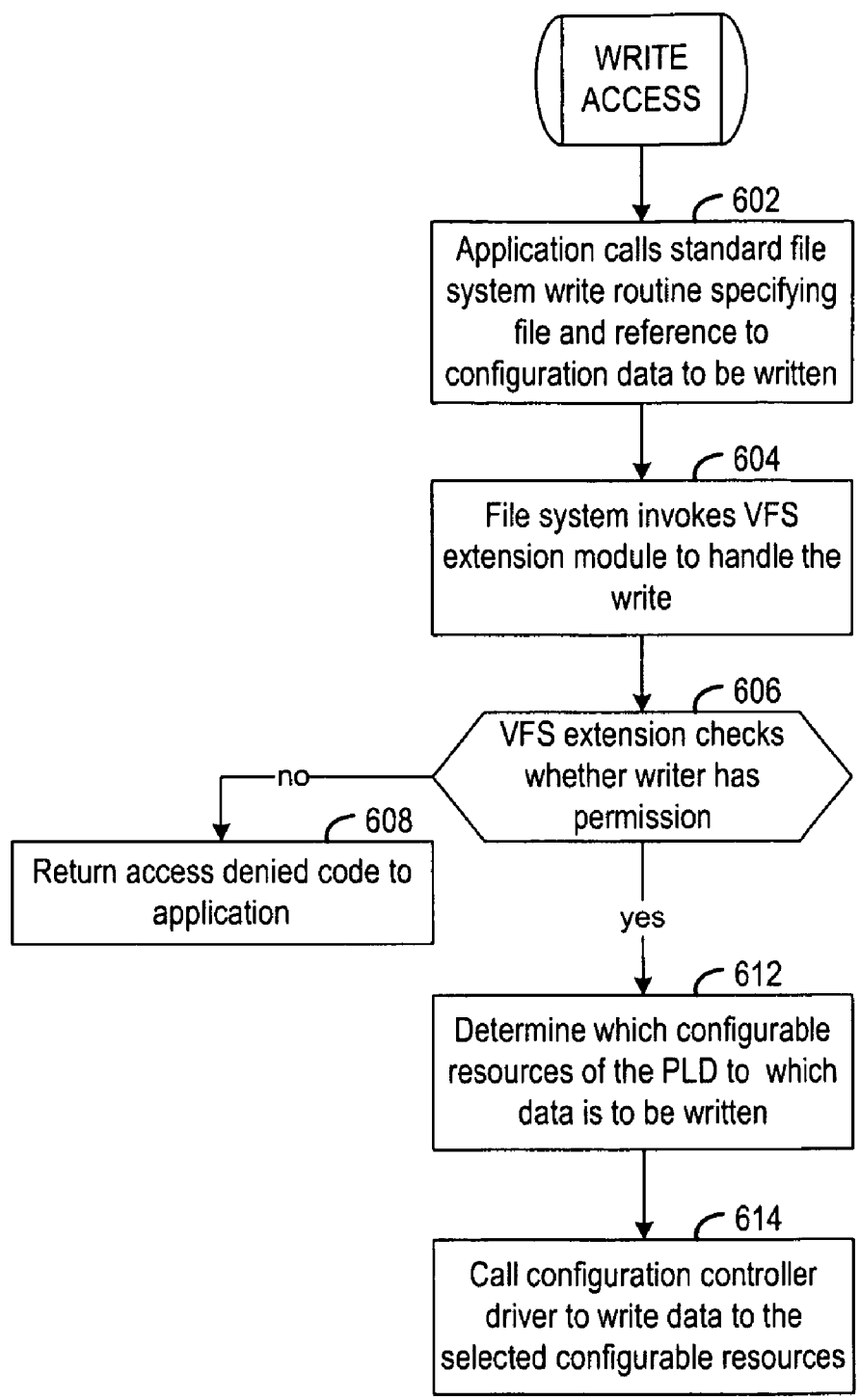
FIG. 6 is a flowchart of an example process for providing write access to data of a PLD via the hierarchical directory and file view of the PLD resources.

FIG. 6 is a flowchart of an example process for providing write access to data of a PLD via the hierarchical directory and file view of the PLD resources. The write process of FIG. 6 is similar to the read process of FIG. 5, with the difference being that a write operation is performed instead of a read operation.

To write configuration data, an application calls a standard file system routine to write a designated file (step 602). The file system in turn calls the VFS extension module for writing configuration data (step 604). The extension module checks whether the application has permission to write the specified file (or directory) (step 606). If the application lacks permission, control is returned to the calling application with a code that indicates access was denied (step 608). If the application has the requisite permission, the VFS extension modules determine from which configurable resources of the PLD the configuration data is to be written to (step 612). The configuration controller driver is then called to write configuration data to the selected resources of the PLD (step 614).

For both the read and write processes, access to the configuration data may be controlled by way of execute permissions that are associated with executable files. For example, the configuration controller driver 240 may provide customized, executable files that manipulate the other data files available in the subdirectory tree. The executable files may be shell scripts, binary code, or the opening of a file with execute permission may be intercepted and interpreted as a request to perform the operations specified by the file.

In yet another embodiment, the contents of an executable file may be associated with redirecting control flow into the VFS module code itself. The module then performs the specific behavior represented by the given file in response to the user-space request to open the file for execution. The VFS, internally, may schedule the execution of some specific method defined within the VFS driver code. The invoked executable file immediately returns control to the caller. This mechanism is similar to invoking wrapped system calls except actual operating system calls (e.g., UNIX sys or files system calls) are not being invoked. The methods are specific to the VFS's control of the FPGA.

Still further file-based operations may be used in manipulating PLD configuration data. For example, operations on special file types, such as named and anonymous pipes, may be used to trigger functions of the configuration controller driver 240. One example operation is the creation of a named pipe. The actions performed by the VFS extension modules depend on the part of the directory structure (e.g., 208) in which the pipe is created. For example, the VFS extensions may alter the configuration of the portion of the PLD associated with the interconnect file in the floorplan subdirectory when a named pipe is established between the two regions. Symbolic link files may be interpreted by the VFS extensions for a similar purpose. The difference between named pipes and symbolic link files is that the operating system may create a process for a named pipe, where as the symbolic link is a static object in the file system.

Additional system routines may be defined to operate on the files that represent PLD configuration data. An example is a routine that freezes or halts the PLD. This routine may be needed because it may take hundreds of system clock cycles to read back data from a region of PLD. During this time the states of flip flops, registers, and look-up table RAM may be changing. Thus, a halt routine may be needed to disable the clock to a selected region of the PLD. While the clock is halted, the configuration and state data may be read from the device. A routine that resumes the clock may also be implemented. In some embodiments standard software tools (e.g., diff, tar, cvs) can be used on the files and directories of the VFS to perform debug functions like check pointing, interrogation, archive and roll-back of the PLD state.

In yet another embodiment, the VFS may be configured to mount (the mount function being provided by the host operating system) a bitstream file rather than manipulating the data of an actual FPGA. In this embodiment, the VFS code causes the configuration controller driver to manipulate the data of another file as if it were an actual, live FPGA configuration memory. In this embodiment, the low level function calls of the VFS driver manipulate the contents of a file in some other standard file system, even though to the user of the VFS the appearance is that actual configuration memory of an FPGA is being manipulated.

The bitstream file is a file that is ready for downloading to the FPGA for configuring the device. The VFS may contain low level routines that emulate the memory of the FPGA such that the bitstream data is parsed into the correct, emulated memory cells. Updates are made to the bitstream file by way of actions on the files in the hierarchy.

Figure 7:
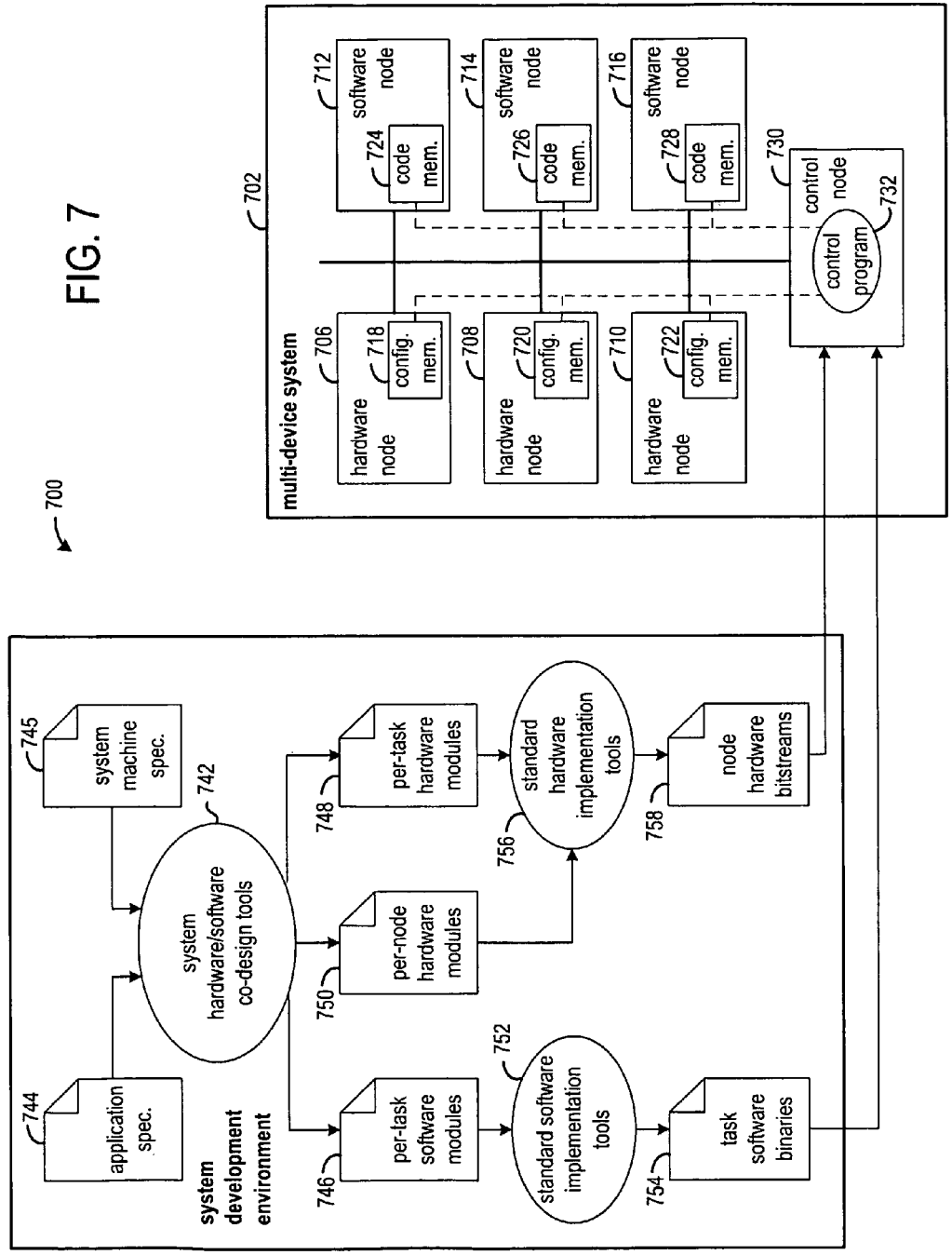
FIG. 7 is a block diagram that illustrates an example design flow for implementing a multi-device system.

FIG. 7 is a block diagram that illustrates an example design flow 700 for implementing an application on a multi-device system 702. The example target system 702 includes multiple hardware nodes 706, 708, and 710 and multiple software nodes 712, 714, and 716. The hardware nodes have respective configuration memories 718, 720, and 722, such as those used to configure the logic in programmable logic devices. The software nodes include processors (not shown) which execute program code stored in code memories 724, 726, and 728. The control node 730 executes a control program 732, which controls the loading of configuration data into the configuration memories and the loading of program code into the code memories. Various embodiments of the invention may be used to replace or complement the control program.

The hardware/software co-design tools 742 process application specification 744, using the system machine specification 745, into hardware and software components, including per-task software modules 746, per-task hardware modules 748, and per-node hardware modules 750. The per-task software modules are further processed by standard software implementation tools 752 into task software binaries 754. The control program 732 loads the software binaries on the software nodes 712, 714, and 716 according to processing requirements of the software.

The nodes of a supercomputer may require infrastructure modules that must be configured before a node can accept a task. These modules are shown as the per-node hardware modules 750. Example per-node hardware modules include a memory controller or a serial communication interface. The per-node hardware modules remain resident on the nodes. A per-task hardware module 748 may be resident for only as long as a task is active, and when the task is inactive the per-task hardware module may be swapped out for a different per-task hardware module. The per-task hardware modules 748 and the per-node hardware modules 750 are processed by standard hardware implementation tools 756 into node hardware bitstreams 758. The control program 732 loads the bitstreams into configuration memories 718, 720, and 722 of the nodes 706, 708, and 710.

Figure 8A:
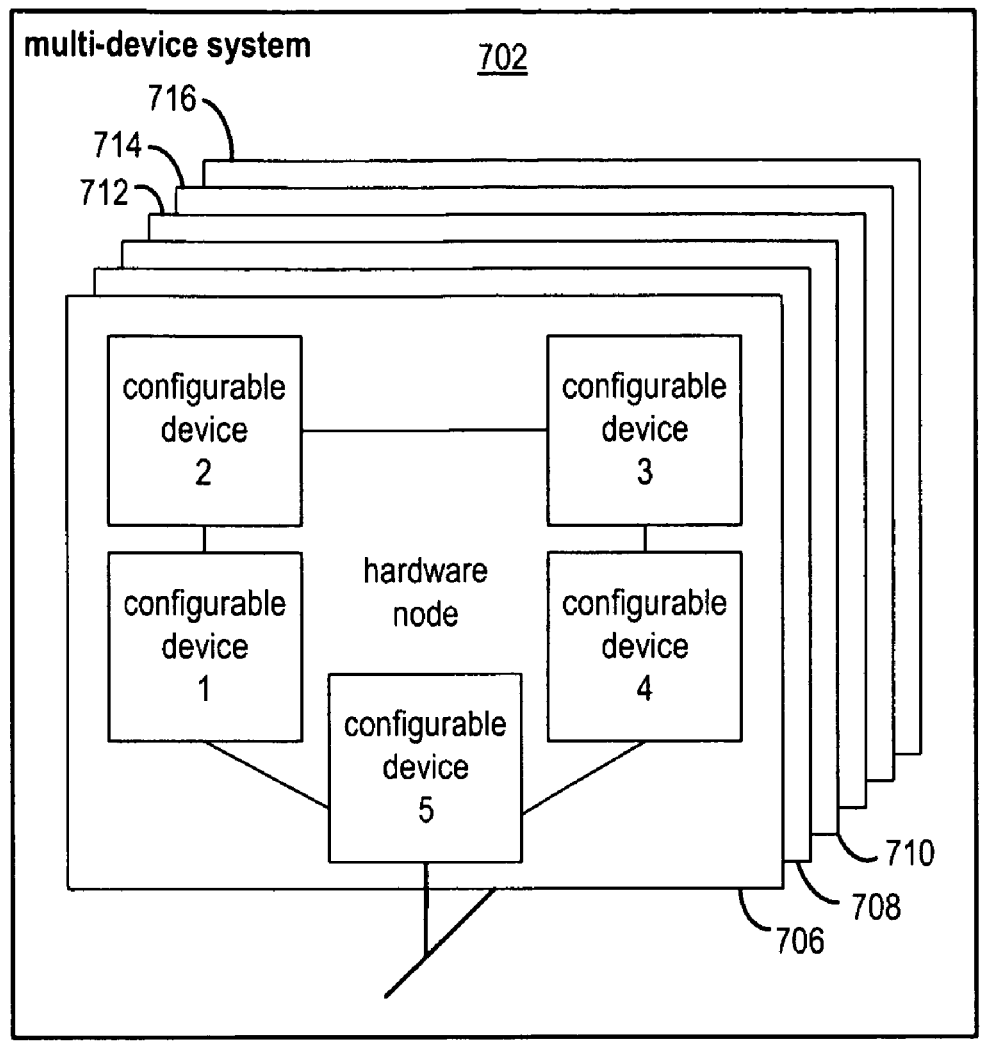
FIG. 8A illustrates an alternative view of the multi-device system of FIG. 7, and FIG. 8B contains a virtual file system (VFS) view of the directories corresponding to the devices and resources of the system and of the files containing configuration data for the system.
Figure 8B:
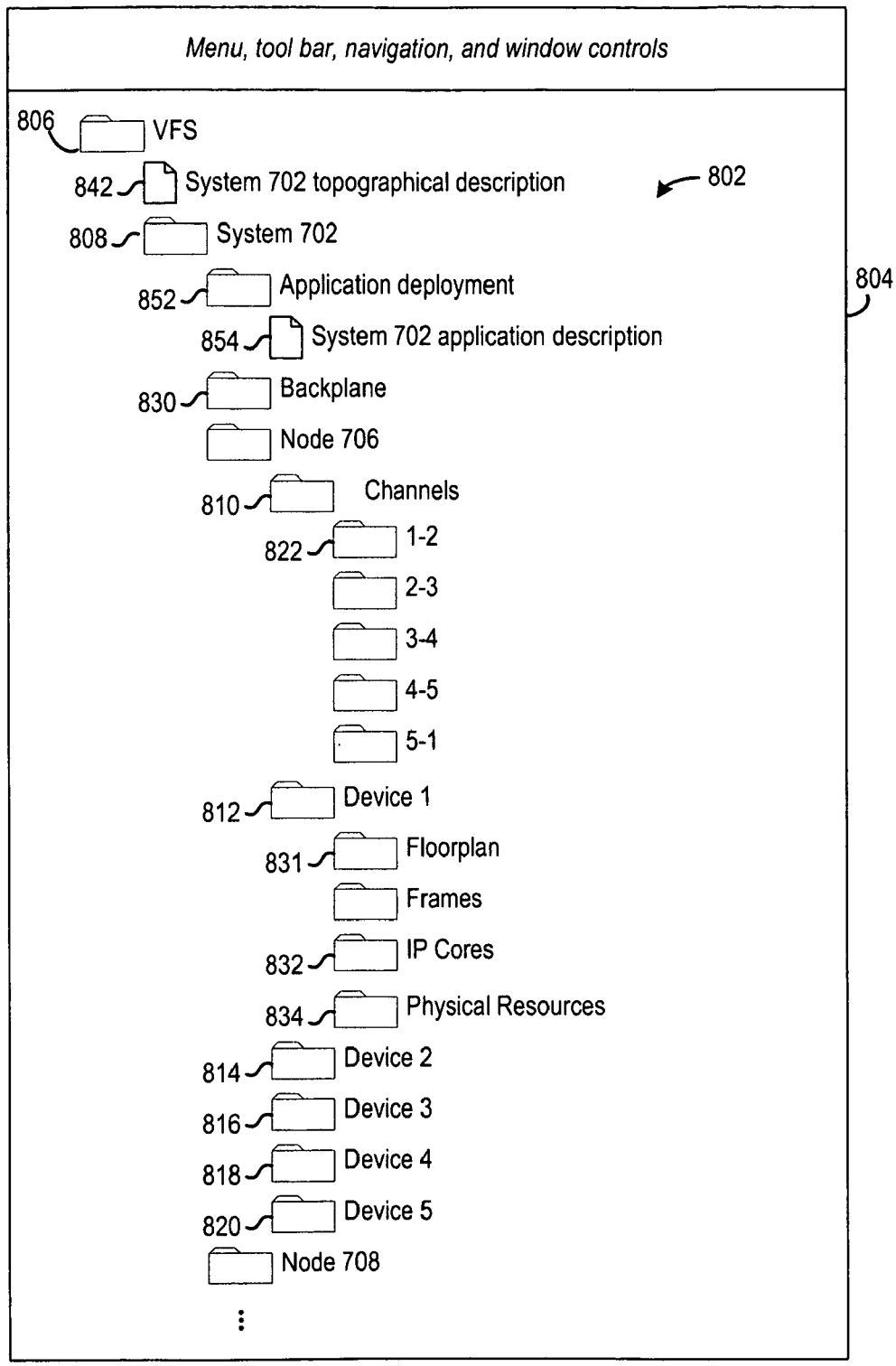

FIG. 8A illustrates an alternative view of the multi-device system 702 of FIG. 7, and FIG. 8B contains a virtual file system (VFS) view of the directories corresponding to the devices and resources of the system and of the files containing configuration data for the system. The nodes 706, 708, 710, 712, 714, and 716 of system 702 in FIG. 7 are shown as blocks with the same reference numbers in FIG. 8A. Hardware node 706 is shown as having configurable devices 1-5.

In accordance with one embodiment, the multi-device system hardware configuration is used to generate a directory structure 802 (FIG. 8B), which is illustrated by an example display screen shot 804. The directory structure reflects the hierarchical architecture of the multi-device system itself, which in the example is a hierarchical collection of compute nodes that are interconnected with communication channels that may, themselves, be aggregated onto high-speed communication backplanes.

Under the top-level virtual file system (VFS) directory 806, there is one directory for each system that is accessible from a user's terminal. In the example, a directory 808 is shown for the system 702. Under the system directory, additional levels of directories reflect the logical architecture of the system's compute nodes. For example, node 706 includes a channels directory 810, along with device directories 812, 814, 816, 818, and 820 for devices 1-5 shown in FIG. 8A.

The channels directory 810 contains one or more subdirectories that represent the communication channels between devices within a node of the multi-device system. The example subdirectories of the channels directory are named according to the device at each end of the channel. For example, the 1-2 channel subdirectory 822 represents a communication channel between device 1 and device 2 in node 706 of the multi-device system.

Each channel subdirectory contains files and scripts that represent the configuration settings and control parameters for the communication channel. Scripts within a channel subdirectory may be used to verify that the channel is operating correctly. This allows the user or administrator of the supercomputer to diagnose and repair faulty links or alter the provision of bandwidth over the channel. Another use would be to automate the setting of certain channel modes/complex parameter sets. Since the hardware resources that control a channel will be implemented in two physically separate devices, the channel files and directories abstract this physical separation of the channel's communication hardware. To the user of the VFS supercomputer view, the resources of both the receive and transmit hardware for the complete channel is presented in a single directory.

The backplane communication architecture for the system 702 is represented by directory 830. Files within the backplane directory represent control parameters for the backplane communication hardware. Users and administrators alter the communication resources dedicated to boards attached to the backplane (and the channels within those boards that actually connect to the backplane) by manipulating the data files contained within the backplane directory. Symbolic link files represent the channels on individual boards connected to the backplane.

The floorplan directory 831 corresponds to the floorplan directory shown in FIG. 2 and FIG. 3B and previously described, the IP-cores directory 832 corresponds to the cores directory shown in FIG. 3D and previously described, and the physical resources directory 834 corresponds to the resources directory shown in FIG. 3A and also previously described. The frame directory contains either a single file or a directory with several files representing one of the FPGA's configuration frames.

The System 702 topographical description 842 is the file that is parsed to produce the directory hierarchy 802 for system 702. The file contains a topographic description of the architecture, as reflected in the illustrated hierarchy. In response to the file 842 being copied to the VFS directory 806, a parser in the operating kernel interprets the node and channel specifications and creates the appropriate set of directories and files, examples of which are shown in hierarchy 802.

The application deployment directory 852 is automatically created by the VFS under the system directory 808 for storing the file(s) that implement an application on the system 702. The file(s) under the application deployment directory is copied there by the user, and in the example, the file 854 contains the application description for system 702. The file(s) in the directory may contain configuration data for PLDs and/or software for the one or more processors in the system.

Figure 9:
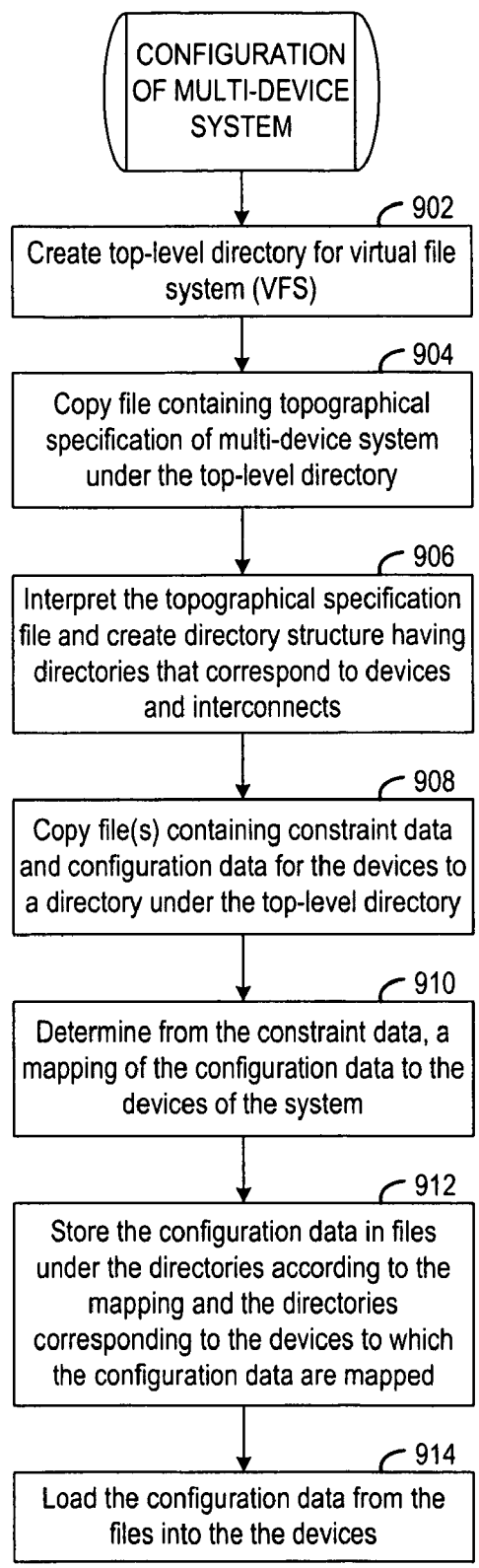
FIG. 9 is a flowchart of an example process for configuring a multi-device system in accordance with one or more embodiments of the invention.

FIG. 9 is a flowchart of an example process for configuring a multi-device system in accordance with one or more embodiments of the invention. At step 902, the user creates a top-level directory for the virtual file system (VFS). This directory is available for storing the directory hierarchies for one or more multi-device systems, such as the example hierarchy shown in FIG. 8B.

To create a hierarchy for a specific multi-device system, the user copies a file containing a topographical specification of the multi-device system under the top-level directory at step 904. In response to the copy command at step 906, a parser in the kernel module interprets the node and channel specifications contained in the file and creates the appropriate, corresponding set of files and directories.

Standard file and directory access control mechanisms are used to grant and revoke access to files and directories. This mechanism can be used in the control sharing of the system's resources between different users. This allows the users to run their applications on the same physical machine, using only a subset of the machine's physical resources. The access control list mechanism of the file system prevents one user from interacting with parts of the system that are currently allocated to a different user. A system manager can use an interactive shell or script to modify the access permissions of a given set of nodes, effectively allocating and deallocating the nodes and devices of the system as they are required by users. The access permissions for file system objects can also be set per group instead of per user. With this mechanism, users can only access the resources assigned to the groups to which they belong.

The embodiments of the present invention automate the process of mapping application hardware tasks to the hardware resources of the computer. The application developer or compiler provides assistance in this process by specifying certain requirements that must be satisfied for the application to be run. For example, if two tasks require high bandwidth communication to operate effectively, this constraint is presented in a meta-file or embedded inside of the application binary itself to create a single "fat-binary" of all the individual tasks and their operational constraints. To deploy an application onto the supercomputer hardware, the user copies the fat-binary (or the standard binary with a corresponding constraint file) into the application deployment directory of the VFS. Step 908 shows the copying of the file(s) containing constraint data and configuration data (hardware tasks) for the devices to a directory under the top-level directory. The file 854 in FIG. 8B is an example of such a file(s).

The VFS parses the file(s) as they are created, extracting the individual hardware tasks and the constraints on those tasks. At step 910, the VFS determines from the constraints, a mapping of configuration data to the devices of the system. The mapping indicates on which nodes and devices the individual tasks will be loaded.

Standard mapping and constraint solving algorithms are used to solve the mapping problem for the application tasks. The user need not be familiar with the details of the mapping algorithm due to the abstraction provided by the VFS file and directory representation. In another embodiment, the mapping algorithm may be exposed to the user as a distinct file in the VFS. This would allow the system administrator to alter the specific algorithm used, over time, by copying files containing new algorithms into the VFS as necessary. The behavior of the VFS itself may be modified by copying new program binary files into its file system structure. This is especially useful in systems such as supercomputers where the distribution of application tasks requires algorithms that are optimized and, perhaps, proprietary to the supercomputer platform being targeted.

The VFS copies the configuration data file(s) into the directories representing devices of the system according to the mapping. For example, the configuration data would be stored under the IP Cores directory 832 of a device directory as shown in FIG. 8B. Step 912 shows the storing of the configuration data in files under the directories according to the mapping and the directories corresponding to the devices to which the configuration data are mapped.

At step 914, the VFS loads the configuration data from the files into the devices, thereby configuring the devices to implement the hardware tasks. If the load operation is successful, a new directory containing symbolic links (not shown) to the directories representing each task on each node is created in the IP Cores directory. If the load operation is unsuccessful, no directories will be created. Instead, a report file will be created, listing the error conditions experienced (i.e. too many tasks for the given node or task constraints violated). Internally, the VFS maintains information about the deployment state of each node in the system. This allows multiple applications to be loaded in the same system with the VFS mapping each to the available resources accordingly.

The following Example 1 shows commands used in deploying an application on an example system. The sequence of commands shows that the application "sc1.app" is loaded successfully. However, the subsequent attempt to load "sc2.app" into the same computer fails because the mapping algorithm in the VFS determines there are insufficient communication and hardware resources available.

cmd> ls /vfs/system702/application_deployment
. . .
cmd> cp ~user1/sc1.app /vfs/system702/application_deployment
cmd> ls /vfs/system702/application_deployment
sc1/sc1.app
cmd> ls /vfs/system702/application_deployment/sc1
task1/@ task2/@ task3/@ task4/@
cmd> cp ~user1/sc2.app /vfs/system702/application_deployment
cmd> ls /vfs/system702/application_deployment/
sc1/ sc1.app sc2.rpt
cmd> cat /vfs/system702/application_deployment/sc2.rpt
VFS: Application Load Failed
Constraint Violated: task 1, ch1 bandwidth reservation not met
Constraint Violated: task 3, insufficient hardware available Example 1

The first command (ls) lists the contents of the vfs/system702/application_deployment directory, which is initially empty. The second command copies (cp) the user's sc1.app to the application_deployment directory. The list commands (ls) that follow show that the sc1.app application was copied and also that the sc1 directory was created under the application_deployment directory and the new sc1 directory contains symbolic links to the directories representing each task on each node.

The second copy command specifies copying the sc2.app application to the application_deployment directory. The list of that directory shows that an sc2.rpt report file was generated, and the cat of that report file shows the reasons that the loading of the application failed.

Figure 10:
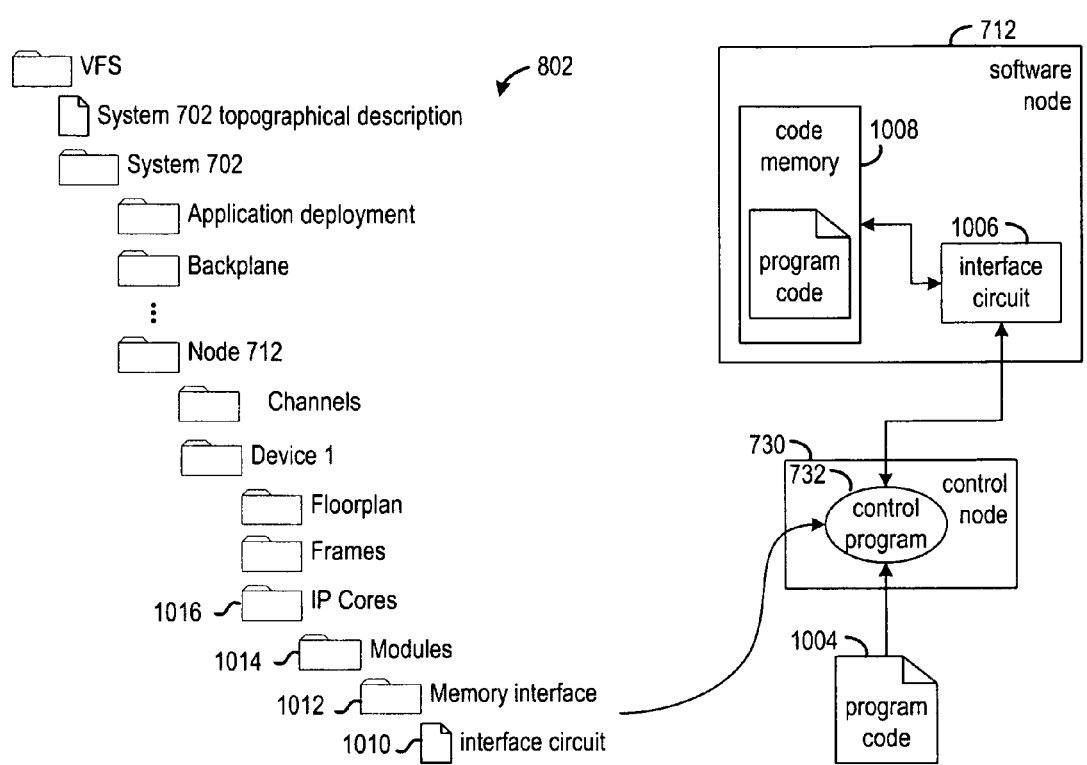
FIG. 10 shows the installation of program code into a memory device of the system through use of a file system operation on the VFS to initiate the installation.

Once hardware tasks have been configured onto the system, the user may desire to distribute software tasks into program memories. FIG. 10 shows the installation of program code into a memory device of the system through use of a file system operation on the VFS to initiate the installation. Software node 712 represents a node of the system 702 to which the program code 1004 is to be installed. The directory hierarchy 802 is expanded under the IP Cores directory of the Node 712 directory to show the additional directories used in deploying software.

A memory interface circuit 1006, which includes a FIFO input buffer (not shown), for example, is configured into the software node 712 that is to receive the program code or "software task." This interface circuit allows the VFS to write program code into the code memory 1008 of the software node. The target memory may be off-chip SRAM or DRAM. In the VFS, the registers of the interface circuit are exposed as the input side of a named pipe file, "interface circuit" 1010. The memory interface circuit file is created in the memory interface directory 1012, which the VFS created in the modules directory 1014 of the IP Cores directory 1016 for node 712. With a standard shell command, the VFS user streams the program code into the named pipe. As the VFS receives the program code, the VFS provides the program code to the control program 732, which writes each word into the interface circuit's 1006 input register. If the interface circuit's FIFO is full, the VFS causes the user's command to stall via a standard 10 block. Example 2 below shows commands that illustrate the interface circuit that is configured in device1 of node 712, and the streaming of the program, app.elf, to the interface circuit.

cmd> ls
/vfs/system702/node1/device1/ip/modules/memory_interface
interface_circuit|
cmd> cat app.elf >
/vfs/sc1/system702/device1/ip/modules/memory_interface/
interface_circuit Example 2

As the application runs on a system such as a supercomputer, it may become necessary to relocate individual tasks to different node(s). Motivations for relocation include redistribution of tasks to allow a new application to be run and moving tasks that are residing on a node with potential hardware faults. The services of the VFS can be used to transfer the tasks between nodes either by an administrator or an automated control program. To achieve the relocation, both the state and the structure of the tasks are relocated. Known techniques may be used to reduce the amount of active state in a given hardware task. Assuming such techniques have been applied, the VFS IP core view is used to gather all the active state elements into a single file. Similarly, the files of the VFS floorplan view allow the structure of the circuit to be extracted from the bitstream and presented as a single file. To relocate a task the VFS user would issue the series of shell commands shown below in Example 3.

First, the current state of the task is saved . . .
cmd> ls /VFS/system702/node706/device1/ip/modules/
memory_if/ mpeg4_dec/ vga_in/
cmd> ls /VFS/system702/node706/device1/ip/modules/
memory_if/
state.bit <<.. and other standard IP view files ..>>
cmd> cd /VFS/system702/node706/device1
cmd> tar zcf ~/t1state.tgz ./ip/modules/*/state.bit
cmd> cp
/vfs/system702/node706/device1/floorplan/task1/structure.bit
~/t1_str.bit
And then restored in a different node . . .
cmd> cp ~/t1_str.bit /vfs/system702/node708/
device2/floorplan/task1/structure.bit
cmd> cp /vfs/system702/node706/device1/ip/src/*
/vfs/system702/node708/device2/ip/src
cmd> tar zxf ~/t1state.tgz /vfs/system702/node708/device2

Example 3

Figure 11:
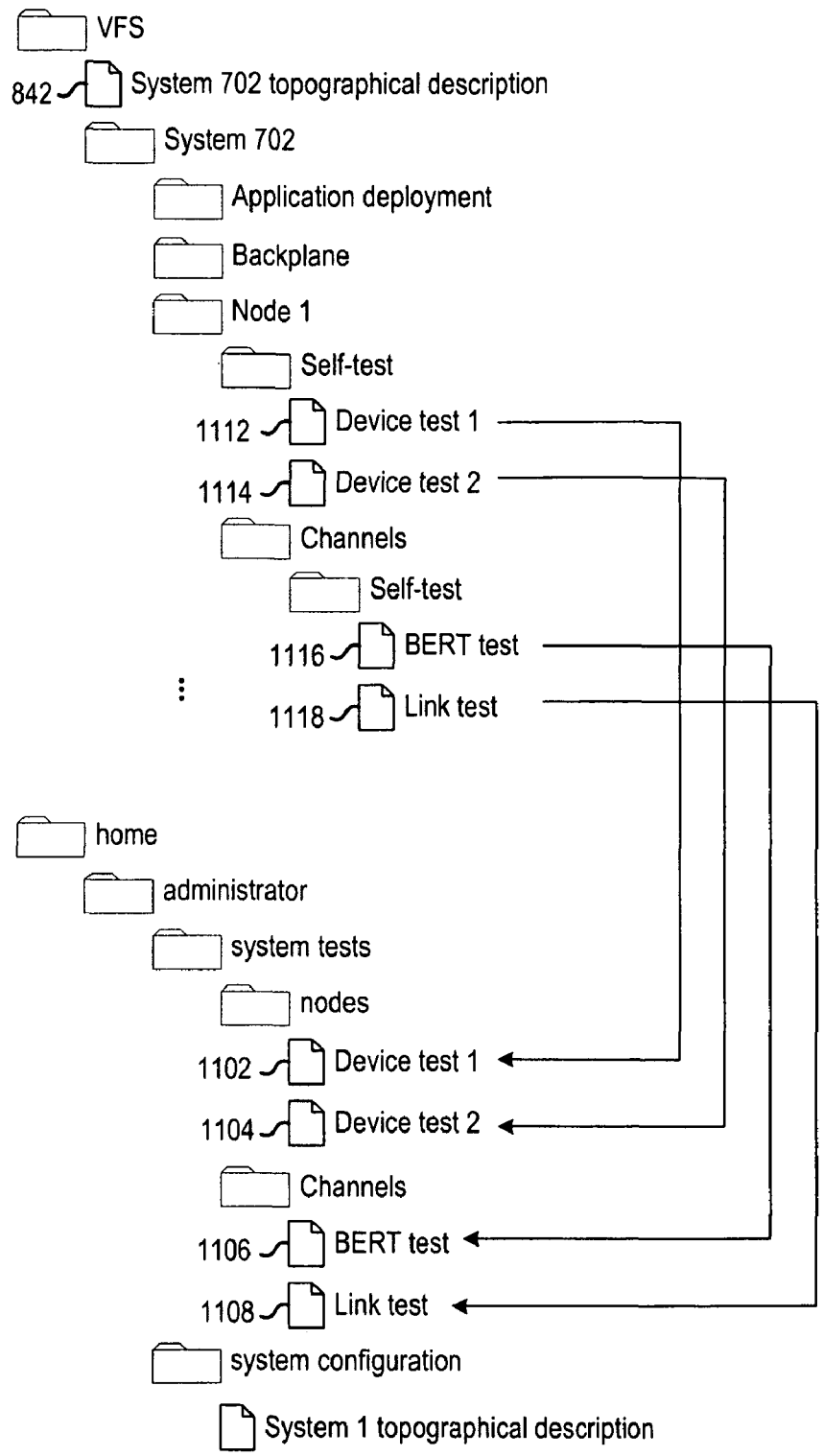
FIG. 11 shows how the VFS directory structure for the example system may be used in implementing self-test programs for the system and for devices in the system.

FIG. 11 shows how the VFS directory structure for the example system may be used in implementing self-test programs for the system and for devices in the system. In multi-device systems such as supercomputers, the probability of a hardware fault is high because of the inherent mean-time-to-failure of semiconductor devices. The VFS supercomputer view includes features for supporting self-test of the system's hardware resources. The first feature is the placement of automatic test scripts into the VFS directories. In the example, there are four example tests: device test 1 in file 1102, device test 2 in file 1104, Bit Error Rate Test (BERT) test in file 1106, and link test in file 1108. These scripts are likely to be produced by the supercomputer manufacturer and are linked into the appropriate locations of the supercomputer directory view.

The files 1102, 1104, 1106, and 1108 are identified in the system topographical description 842, and the VFS creates hard symbolic links to these files in the VFS directory hierarchy. The links are represented as the directional lines that link the files 1112, 1114, 1116, and 1118 to the files 1102, 1104, 1106, and 1108, respectively. The administrator or user may execute these scripts, perhaps during the initialization sequence of an application, to verify that the machine hardware is operating correctly. To execute the test, the script may be initiated as would any other script or application binary. The results are communicated back to the user via terminal, for example, or redirected to a stored file. Complex test programs may use the workstation's windowing environment to communicate the results of the test while it executes on the system hardware.

The following description is based in a specific example implementation of the VFS self-test approach. The WINDOWS® operating system, available from Microsoft Corporation of Redmond, Wash., interprets files with certain names in special ways. For example, when a user inserts a CD-ROM into a workstation running the WINDOWS® operating system (OS), the OS searches for a file named, "autoexec.bat.". If this file is found, the contents of that file are automatically executed. This allows software CDs to call up an installer program without user intervention. The VFS may use a similar mechanism to automatically execute a pre-designated set of test scripts when a given VFS directory is browsed. For example, a user may determine that an application is not functioning correctly on the system. A battery of self-test programs may be executed by double-clicking on the self-test directory in VFS directory view. The specific set of tests run when the directory is opened would be specified in the autoexec.bat file contained within that directory. This test method relies on the automatic-run feature of the OS being used to browse the VFS file structure. A similar behavior may be encoded directly into a file system such that the VFS itself executes a specified file when a directory is opened. The results output from executing these self-test scripts may appear as files in the directory with file timestamps corresponding to the time the test was run. If enough memory resources are available in the platform running the VFS, multiple result files may be held in the directory. This method would be less dependent on the specific features of the client windowing system that is browsing the VFS.

Figure 12A:
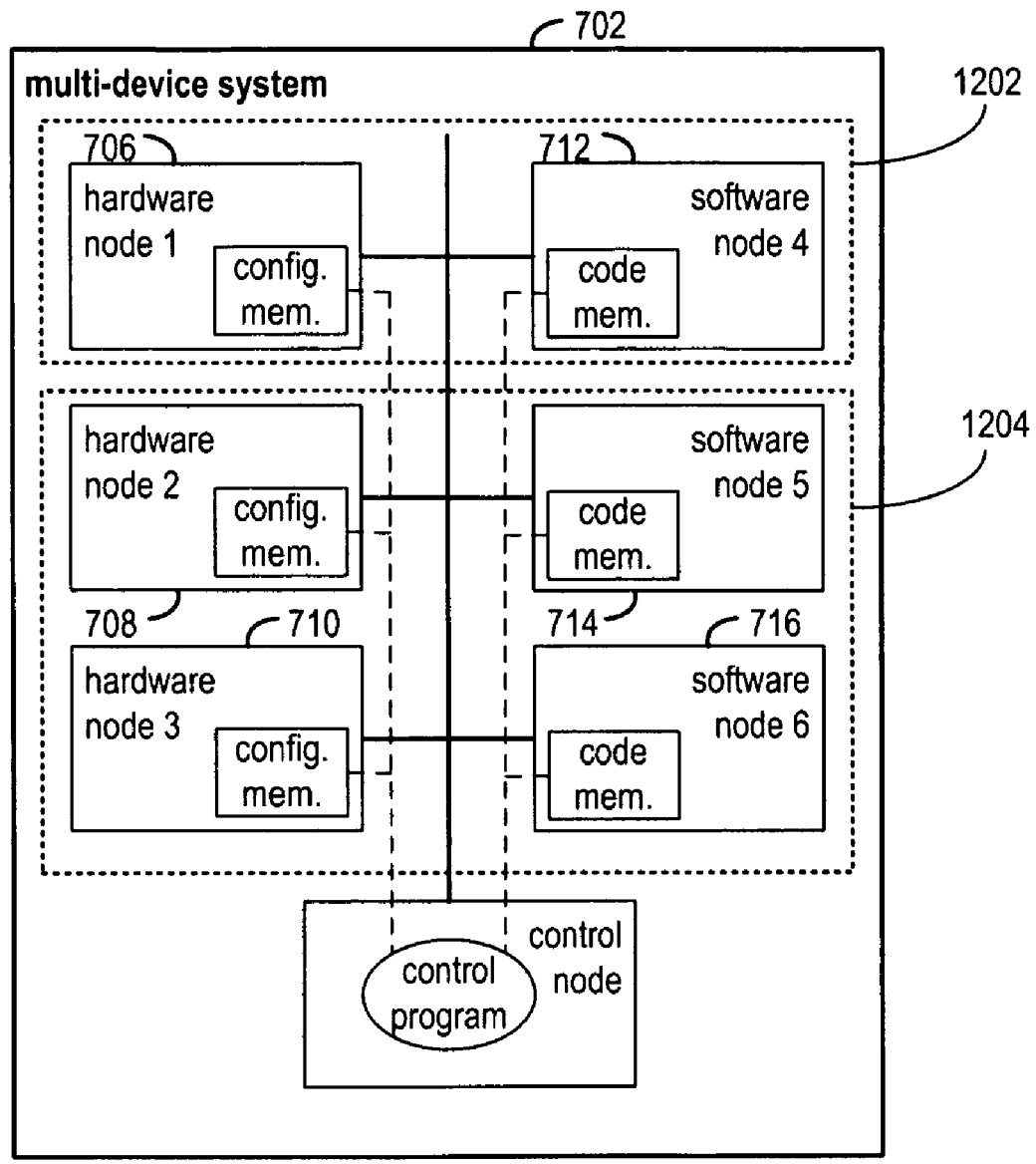
FIG. 12A is a block diagram of the multi-device system of FIG. 7 configured as two virtual systems.

FIG. 12A is a block diagram of the multi-device system 702 of FIG. 7 configured as two virtual systems 1202 and 1204. Virtual system 1202 includes nodes 706 and 712, and virtual system 1204 includes nodes 708, 710, 714, and 716. Virtual systems have application in the area of supercomputers in that virtual supercomputers provide further abstraction of the physical nodes of the supercomputer by presenting a subset of the physical computer resources as a distinct "virtual" computer. To a user, it appears as though there is complete access to the whole physical supercomputer. However, in reality the VFS translates file and directory accesses made by the application into node-specific file and directory accesses.

In one embodiment, a virtual system view can be defined by adding certain constraints to the specification file. Specifically, the constraints allow the system manager to aggregate nodes, devices, channels and backplane bandwidth allocations. Time sharing of the supercomputer resources may be achieved if the VFS is augmented with an appropriate runtime system to cache the intermediate states of the virtual supercomputer views as they are mapped on and off the actual hardware.

Figure 12B:
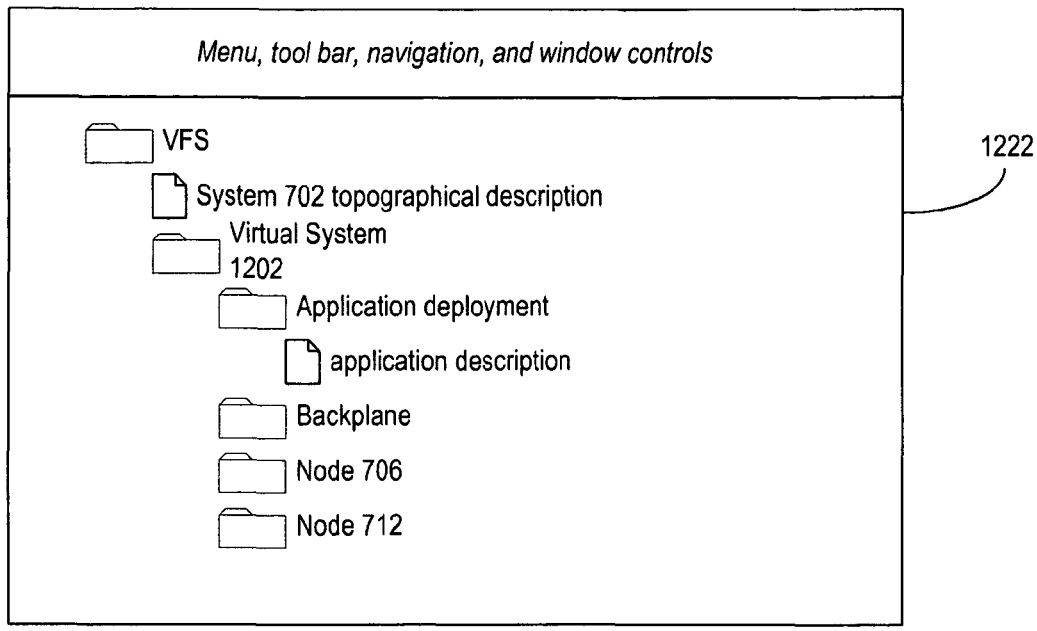
FIG. 12B shows a user's VFS view of a first virtual system.
Figure 12C:
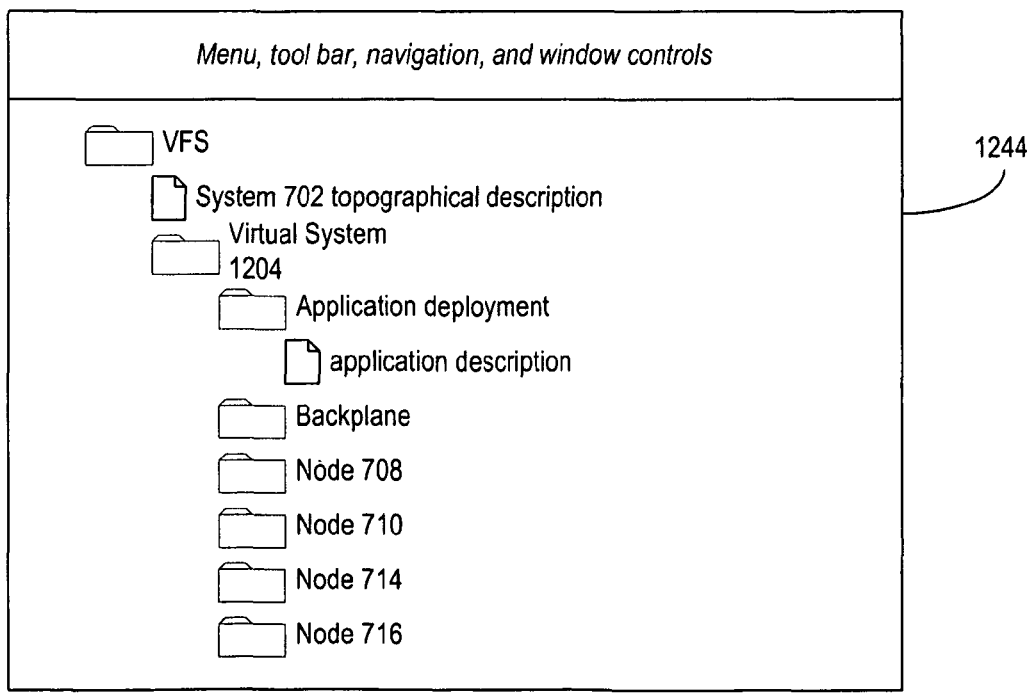
FIG. 12C shows a user's VFS view of a second virtual system.

FIG. 12B shows a user's VFS view of virtual system 1202, and FIG. 12C shows a user's VFS view of virtual system 1204. The view VFS 1222 shows that the user of virtual system 1202 sees directories for nodes 706 and 712, but not for the other nodes (708, 710, 714, and 716) of the actual system 702. Similarly, the user of virtual system 1204 sees only the directories for nodes 708, 710, 714 and 716 but not for the other nodes (706 and 712) of the actual system.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

One or more embodiments of the present invention may be applicable to a distributed aggregation of devices such as, e.g., a group of linked FPGAs, or supercomputers employing linked processors. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for controlling configuration of a plurality of devices of a multi-device circuit arrangement, comprising:

creating, using a processor, a top-level directory of a virtual file system, wherein the virtual file system is registered with an operating system;

in response to contents of a first file that contains an architecture description of the multi-device circuit arrangement and instantiation of the first file under the top-level directory, creating a hierarchy of device directories under the top-level directory, wherein the hierarchy of device directories have names indicative of the plurality of devices, and wherein each of the hierarchy of device directories includes at least one resource directory that includes at least one subdirectory or file that represents configuration data for programming configurable resources of a corresponding one of the plurality of devices of the multi-device circuit arrangement in order to perform functions specified by the configuration data, wherein each of the plurality of devices is a configurable integrated circuit;

determining a mapping of the configuration data to the resources of the plurality of devices; and storing the configuration data in the configurable resources according to the mapping, wherein the creating the hierarchy of device directories under the top-level directory in response to instantiation of the first file is in response to a copy-file operating system file access command that creates under the top-level directory the first file that contains the architecture description.

2. The method of claim 1, wherein determining the mapping comprises:

reading constraint information from the first set of one or more files;

determining resources of the plurality of devices that satisfy the constraints; and assigning the configuration data to the resources determined to satisfy the constraints.

3. The method of claim 1, further comprising, in response to invocation of an operating system file access command that inputs program code from a program file to a memory device of the plurality of devices, performing the steps including:

creating an interface circuit for the memory device; and reading program code from the program file, inputting the program code to the interface circuit, and writing the program code to the memory device.

4. The method of claim 3, wherein the operating system file access command that inputs program code from a program file to a memory device is a command that inputs the program file to a named software pipe associated with the interface circuit.

5. The method of claim 1, further comprising:

reading the state data from a first device in response to invocation of an operating system file access command that references a file under a directory that represents the first device;

storing the state data in a second device in response to invocation of an operating system file access command that references a directory that represents the second device; and storing configuration data in the second device in response to invocation of an operating system file access command that references a directory that represents the second device.

6. The method of claim 1, further comprising automatically starting a self-test of one of the plurality of devices in response to invocation of an operating system file system command on a directory that represents the one of the plurality of devices.

7. The method of claim 6, wherein the operating system file system command on the directory is a command that opens the directory.

8. The method of claim 1, further comprising:

wherein the creating the hierarchy of device directories includes creating two or more virtual system directories under the top-level directory and a respective hierarchy of device directories under each virtual system directory, each virtual system directory represents a respective virtual system, and the directories under each virtual system directory are respectively representative of a subset of the plurality of devices and configurable resources of the subset assigned to the virtual system represented by the virtual system directory;

assigning access rights to the virtual system directories for users of the virtual systems; and denying access to one of the two or more virtual system directories and the respective hierarchy of device directories under the one of the virtual system directories in response to a user invoking an operating system file system access command that references the one virtual system directory or the respective hierarchy of device directories, and the user not having access rights to the one virtual system directory.

9. The method of claim 1, wherein creating a hierarchy of device directories under the top-level directory comprises creating the hierarchy of device directories under the top-level directory in response to invocation of an operating system file access command.

10. The method of claim 1, further comprising at least one channel directory that represents a plurality of communication channels between the plurality of devices.

11. A storage device, comprising:

a non-transitory processor readable medium configured with instructions for controlling configuration of a plurality of devices of a multi-device circuit arrangement, the instructions when executed by one or more processors causing the one or more processors to perform the steps including:

creating a top-level directory of a virtual file system, wherein the virtual file system is registered with an operating system;

in response to contents of a first file that contains an architecture description of the multi-device circuit arrangement and instantiation of the first file under the top-level directory, creating a hierarchy of device directories under the top-level directory, wherein the hierarchy of device directories have names indicative of the plurality of devices, and wherein each of the hierarchy of device directories includes at least one resource directory that includes at least one subdirectory or file that represents configuration data for programming configurable resources of a corresponding one of the plurality of devices of the multi-device circuit arrangement in order to perform functions specified by the configuration data, wherein each of the plurality of devices is a configurable integrated circuit;

determining a mapping of the configuration data to the resources of the plurality of devices; and storing the configuration data in the configurable resources according to the mapping, wherein the creating the hierarchy of device directories under the top-level directory in response to instantiation of the first file is in response to a copy-file operating system file access command that creates under the top-level directory the first file that contains the architecture description.

12. The storage device of claim 11, wherein determining the mapping comprises:

reading constraint information from the first set of one or more files;

determining resources of the plurality of devices that satisfy the constraints; and assigning the configuration data to the resources determined to satisfy the constraints.

13. The storage device of claim 11, wherein the instructions further cause the one or more processors, in response to invocation of an operating system file access command that inputs program code from a program file to a memory device of the plurality of devices, to perform the steps including:

creating an interface circuit for the memory device; and reading program code from the program file, inputting the program code to the interface circuit, and writing the program code to the memory device.

14. The storage device of claim 11, wherein the instructions further cause the one or more processors to perform the steps including:
  reading the state data from a first device in response to invocation of an operating system file access command that references a file under a directory that represents the first device;
  storing the state data in a second device in response to invocation of an operating system file access command that references a directory that represents the second device; and
  storing configuration data in the second device in response to invocation of an operating system file access command that references a directory that represents the second device.

15. The storage device of claim 11, wherein the instructions further cause the one or more processors to perform the steps including automatically starting a self-test of one of the plurality of devices in response to invocation of an operating system file system command on a directory that represents the one of the plurality of devices.

16. The storage device of claim 15, wherein the operating system file system command on the directory is a command that opens the directory.

17. The storage device of claim 11, wherein the instructions further cause the one or more processors to perform the steps including:
  wherein the creating the hierarchy of device directories under the top-level directory includes the creating the hierarchy of device directories under the top-level directory in response to invocation of an operating system file access command, and the creating the hierarchy of device directories under the top-level directory further includes creating two or more virtual system directories under the top-level directory and a respective hierarchy of device directories under each virtual system directory, each virtual system directory represents a respective virtual system, and the directories under each virtual system directory are respectively representative of a subset of the plurality of devices and configurable resources of the subset assigned to the virtual system represented by the virtual system directory;
  assigning access rights to the virtual system directories for users of the virtual systems; and
  denying access to one of the two or more virtual system directories and the respective hierarchy of device directories under the one of the virtual system directories in response to a user invoking an operating system file system access command that references the one virtual system directory or the respective hierarchy of device directories, and the user not having access rights to the one virtual system directory.

* * * * *